United States Patent
Sekioka et al.

(10) Patent No.: US 12,018,109 B2
(45) Date of Patent: Jun. 25, 2024

(54) METHOD FOR PRODUCING CHLOROPRENE GRAFT COPOLYMER LATEX, ADHESIVE CONTAINING SAME AND ADHESION METHOD

(71) Applicant: SHOWA DENKO K.K., Tokyo (JP)

(72) Inventors: Naoki Sekioka, Tokyo (JP); Masanao Kamijo, Tokyo (JP); Noriko Ogawa, Tokyo (JP)

(73) Assignee: Resonac Corporation, Tokyo (JP)

( * ) Notice: Subject to any disclaimer, the term of this patent is extended or adjusted under 35 U.S.C. 154(b) by 533 days.

(21) Appl. No.: 17/421,061

(22) PCT Filed: Nov. 26, 2019

(86) PCT No.: PCT/JP2019/046166
§ 371 (c)(1),
(2) Date: Jul. 7, 2021

(87) PCT Pub. No.: WO2020/144957
PCT Pub. Date: Jul. 16, 2020

(65) Prior Publication Data
US 2022/0064354 A1 Mar. 3, 2022

(30) Foreign Application Priority Data
Jan. 9, 2019 (JP) ................. 2019-002126

(51) Int. Cl.
C08F 279/02 (2006.01)
C08C 19/25 (2006.01)
C08F 2/26 (2006.01)
C08F 2/30 (2006.01)
C08F 230/08 (2006.01)
C08L 11/02 (2006.01)
C09J 151/04 (2006.01)

(52) U.S. Cl.
CPC ............ *C08F 279/02* (2013.01); *C08C 19/25* (2013.01); *C08F 2/26* (2013.01); *C08F 2/30* (2013.01); *C08F 230/085* (2020.02); *C08L 11/02* (2013.01); *C09J 151/04* (2013.01); *C09J 2301/304* (2020.08); *C09J 2400/143* (2013.01)

(58) Field of Classification Search
CPC .......... C08F 279/02; C08F 230/085; C08F 2/16–30; C08L 11/00; C08L 11/02; C09G 111/02; C08C 19/25
See application file for complete search history.

(56) References Cited

U.S. PATENT DOCUMENTS

| | | | |
|---|---|---|---|
| 5,399,625 A | 3/1995 | Glenn, Sr. | |
| 11,028,212 B2 | 6/2021 | Sekioka et al. | |
| 2019/0169344 A1 | 6/2019 | Sekioka et al. | |

FOREIGN PATENT DOCUMENTS

| | | | | |
|---|---|---|---|---|
| CN | 103509214 A | | 1/2014 | |
| CN | 106496432 A | * | 3/2017 | ............ C08F 279/02 |
| JP | 51012856 A | * | 1/1976 | |
| JP | 1-123882 A | | 5/1989 | |
| JP | 1-284544 A | | 11/1989 | |
| JP | 2-286771 A | | 11/1990 | |
| JP | 7-90007 A | | 4/1995 | |
| JP | 9-506133 A | | 6/1997 | |
| JP | 2691961 B2 | | 12/1997 | |
| JP | 2000-7833 A | | 1/2000 | |
| JP | 2004-210994 A | | 7/2004 | |
| JP | 3938906 B2 | | 6/2007 | |
| JP | 2007-191710 A | | 8/2007 | |
| JP | 2013-151585 A | | 8/2013 | |
| JP | 2016001560 A | * | 1/2016 | |
| JP | 2018-168227 A | | 11/2018 | |
| WO | WO-9106580 A1 | * | 5/1991 | |
| WO | 95/15988 A1 | | 6/1995 | |
| WO | 2018/030210 A1 | | 2/2018 | |

OTHER PUBLICATIONS

Machine translation of JP 51-012856 (no date).*
Machine translation of JP 2016-001560 (no date).*
Machine translation of CN 106496432 (no date).*
Abstract of CN 106496432 (no date).*
International Search Report dated Jan. 21, 2020 in Application No. PCT/JP2019/046166.
Written Opinion of the International Searching Authority dated Jan. 21, 2020 in Application No. PCT/JP2019/046166.
Communication dated Nov. 13, 2020 from the Taiwan Intellectual Property Office in Application No. 108145018.

* cited by examiner

*Primary Examiner* — Marc S Zimmer
(74) *Attorney, Agent, or Firm* — Sughrue Mion, PLLC

(57) ABSTRACT

A method for producing a chloroprene graft copolymer latex includes a step of adding an ethylenic double bond-containing silane coupling agent (B) to a chloroprene polymer latex and graft copolymerizing the ethylenic double bond-containing silane coupling agent (B) to the chloroprene polymer (A) in the chloroprene polymer latex at 10° C. to 50° C. (inclusive). The amount of the ethylenic double bond-containing silane coupling agent (B) added is 0.4 parts by mass to 9.0 parts by mass (inclusive) per 100 parts by mass of the chloroprene polymer (A). The present invention also relates to an adhesive containing the chloroprene graft copolymer latex and to a method for using the adhesive. The present invention can provide a method for producing a chloroprene graft copolymer latex containing no organic solvent and having high adhesive strength to glass, an adhesive containing the same, and a method for using the adhesive.

18 Claims, No Drawings

METHOD FOR PRODUCING CHLOROPRENE GRAFT COPOLYMER LATEX, ADHESIVE CONTAINING SAME AND ADHESION METHOD

CROSS REFERENCE TO RELATED APPLICATIONS

This application is a National Stage of International Application No. PCT/JP2019/046166 filed Nov. 26, 2019, claiming priority based on Japanese Patent Application No. 2019-002126 filed Jan. 9, 2019.

TECHNICAL FIELD

The present invention relates to a method for producing a chloroprene graft copolymer latex, an adhesive containing the latex, and an adhesion method using the adhesive.

BACKGROUND ART

Chloroprene homopolymers and copolymers of chloroprene and other monomers (hereinafter these may be collectively referred to as a chloroprene polymer(s)) are suitably used for adhesive applications such as organic solvent-based contact adhesives due to their high adhesive strength to various types of adherends, obtained by low pressure bonding. In order to deal with regulations such as volatile organic compound (VOC) regulations and organic solvent regulations from the viewpoint of environmental pollution and consideration for human health, aqueous adhesives being free of organic solvents have been developed and aqueous adhesives containing a chloroprene polymer latex have been proposed.

For example, Patent Literature 1 proposes an aqueous adhesive comprising a latex of a copolymer of chloroprene, an α,β-unsaturated carboxylic acid, and 2,3-dichloro-1,3-butadiene. By copolymerizing an α,β-unsaturated carboxylic acid, adhesive strength (heat resistance) at high temperature is increased. However, the aqueous adhesive disclosed in Patent Literature 1 has a problem such that the adhesive strength is lower than the adhesive strength of conventional organic solvent-based adhesives containing a chloroprene polymer or organic solvent-based adhesives containing a chloroprene graft copolymer.

The copolymers of chloroprene and other monomers as disclosed in Patent Literature 1 may have increased adhesive strength compared with the adhesive strength of chloroprene homopolymers due to modification by copolymerization. However, since the copolymerizability of chloroprene with other monomers is low, there are only a few monomers copolymerizable with chloroprene. For this reason, modification by copolymerization is limited. Even in cases of copolymers of chloroprene and a monomer (such as α,β-unsaturated carboxylic acid) being copolymerizable with chloroprene, a copolymer having a high copolymerization ratio is difficult to obtain due to the low copolymerizability of chloroprene. For this reason, significant modification is difficult.

Patent Literature 2 discloses that the affinity of chloroprene for silica can be modified by copolymerizing chloroprene with a conjugated diene-containing silane coupling agent. However, the polymerization is mainly performed in a solution, and when emulsion polymerization is performed, modification effects are limited due to the small amount of the silane coupling agent.

As a method for modifying a chloroprene polymer, graft copolymerization of another monomer to a chloroprene polymer is known, and increased adhesive strength by graft copolymerization can be expected.

For example, Patent Literature 3 to Patent Literature 6 report organic solvent-based adhesives comprising a chloroprene graft copolymer obtained by graft copolymerizing alkyl methacrylate to a chloroprene polymer, and Patent Literature 7 reports that heat resistance can be increased by the graft copolymerization of an alkoxy silyl group-containing low molecular weight compound, which is called a silane coupling agent, in an organic solvent. However, since organic solvents are used, the above embodiments are not preferable from the viewpoint of environmental pollution and consideration for human health.

Patent Literature 8 and Patent Literature 9 report that alkyl methacrylate is graft copolymerized to a chloroprene polymer which is suitable for latex adhesives. However, the application examples of the adhesives are limited to plasticizer-containing adherends such as soft polyvinyl chloride and leather, and are not applicable to glass which is adhesible with chloroprene contact adhesives based on organic solvents.

CITATION LIST

Patent Literature

Patent Literature 1: JP 2007-191710 A
Patent Literature 2: JP 3938906 B2
Patent Literature 3: JP H01-284544 A
Patent Literature 4: JP H01-123882 A
Patent Literature 5: JP H02-286771 A
Patent Literature 6: JP 2000-007833 A
Patent Literature 7: JP 2691961 B2
Patent Literature 8: JP H09-506133 A (U.S. Pat. No. 5,399,625 A)
Patent Literature 9: WO 2018/030210 A1 (US 2019/169344 A1)

SUMMARY OF INVENTION

Technical Problem

The object of the present invention is to solve the above problems involved in the conventional art and to provide a method for producing a chloroprene graft copolymer latex being free of organic solvents and exhibiting high adhesive strength to glass, an adhesive comprising the same, and a method for using the adhesive.

Solution to Problem

An aqueous adhesive comprising water and a chloroprene polymer is a heterogeneous system in which the chloroprene polymer is heterogeneously present in water. Thus, when a chloroprene polymer obtained by the radical emulsion copolymerization of chloroprene and a monomer copolymerizable with chloroprene is compared with a chloroprene polymer obtained by the graft copolymerization of a monomer copolymerizable with chloroprene to a chloroprene polymer which has been prepared by radical emulsion polymerization beforehand, the positions of the structures derived from the monomers in the chloroprene polymers are different, affecting the physical properties. For this reason, when structures derived from monomers exhibit adhesive strength to adherends, graft copolymerization must be performed such that the structures are present on emulsion particle surfaces. In the case of a glass adherend, for example, a monomer comprising a structure exhibiting adhesion effects on glass is aqueous graft copolymerized to a chloroprene polymer.

The present inventors have found that a latex being free of organic solvents and particularly exhibiting high adhesive strength to glass is obtainable by emulsion graft copolymerizing an ethylenic double bond-containing silane coupling agent to a chloroprene polymer under specific temperature conditions, thereby completing the present invention. It is inferred that the above method enables more structural units having excellent adhesiveness to glass to be present on emulsion particle surfaces.

An embodiment of the present invention is as described below.

[1]
A method for producing a chloroprene graft copolymer latex, comprising a step of adding an ethylenic double bond-containing silane coupling agent (B) to a chloroprene polymer latex and graft-copolymerizing the ethylenic double bond-containing silane coupling agent (B) to a chloroprene polymer (A) in the chloroprene polymer latex at a temperature of 10° C. or higher and 50° C. or lower, wherein the addition amount of the ethylenic double bond-containing silane coupling agent (B) is 0.4 parts by mass or higher and 9.0 parts by mass or lower relative to 100 parts by mass of the chloroprene polymer (A).

[2]
The method for producing a chloroprene graft copolymer latex described in [1], wherein the ethylenic double bond-containing silane coupling agent (B) is a (meth)acryloyl group-containing silane coupling agent.

[3]
The method for producing a chloroprene graft copolymer latex described in [1] or [2], wherein the tetrahydrofuran insoluble content in a chloroprene graft copolymer being present in the chloroprene graft copolymer latex is 6% by mass or higher and 70% by mass or lower of the amount of the chloroprene graft copolymer.

[4]
The method for producing a chloroprene graft copolymer latex according to any one of [1] to [3], wherein the chloroprene polymer latex is obtained by radical emulsion homopolymerization of chloroprene (A-1) or by radical emulsion copolymerization of chloroprene (A-1) and a monomer (A-2) being copolymerizable with the chloroprene (A-1).

[5]
The method for producing a chloroprene graft copolymer latex described in [4], wherein an emulsifier used in the radical emulsion homopolymerization or in the radical emulsion copolymerization is at least one emulsifier selected from anionic emulsifiers and nonionic emulsifiers.

[6]
An adhesive comprising a chloroprene graft copolymer latex obtained by the method described in any one of [1] to [5].

[7]
The adhesive described in [6], comprising at least one additive selected from tackifiers, acid acceptors, and antioxidants.

[8]
The adhesive described in [6] or [7] that is used for glass adhesion.

[9]
An adhesion method comprising a step of applying the adhesive described in any one of [6] to [8] onto an adherend and bonding the adherend, a step of drying the adhesive, and a step of performing a heat treatment at a temperature of 50° C. or higher and 100° C. or lower after the drying.

[10]
The adhesion method described in [9], wherein at least one of the adherends is glass.

[11]
A method for producing an adhesive, comprising a step of producing a chloroprene graft copolymer latex by the method described in any one of [1] to [5], and an optional step of mixing with the obtained latex at least one additive selected from tackifiers, acid acceptors, and antioxidants.

[12]
The method for producing an adhesive described in [11], wherein the adhesive is an adhesive for glass adhesion.

[13]
An adhesion method comprising a step of producing an adhesive by the method described in [11] or [12], a step of applying the obtained adhesive onto an adherend and bonding the adherend, a step of drying the adhesive, and a step of performing a heat treatment at a temperature of 50° C. or higher and 100° C. or lower after the drying.

[14]
The adhesion method described in [13] in which at least one of the adherends is glass.

Advantageous Effects of Invention

A chloroprene graft copolymer latex obtained by the production method of an embodiment according to the present invention is free of organic solvents and also exhibits high adhesive strength to glass, with a heat treatment. Namely, if at least one of 2 adherends to be bonded is glass, the 2 adherends can be bonded to each other with the chloroprene graft copolymer latex exhibiting a high adhesive strength of 3.0 kN/m or higher, for example.

DESCRIPTION OF EMBODIMENTS

An embodiment of the present invention is described in detail below. The embodiment shows an example of the present invention, which is not limited thereto. The present embodiment may undergo changes and improvements, and embodiments undergoing the changes and improvements as such are also included in the present invention.

In the present description, a chloroprene polymer latex means a latex in which a lipophilic chloroprene polymer is emulsified with an emulsifier and is dispersed in water in the form of particles, and a chloroprene graft copolymer latex means a latex in which a lipophilic chloroprene graft copolymer is emulsified with an emulsifier and is dispersed in water in the form of particles.

[1] Chloroprene Polymer Latex

A chloroprene polymer latex used in an embodiment of the production method according to the present invention is such that the particles of a chloroprene polymer (A) are dispersed in water.

With respect to a chloroprene polymer latex used in the present invention, the tetrahydrofuran insoluble content in the chloroprene polymer contained in the latex is preferably 1% by mass or higher and 70% by mass or lower, more preferably 3% by mass or higher and 50% by mass or lower, and still more preferably 5% by mass or higher and 40% by mass or lower. When exceeding the upper limit, the tetrahydrofuran insoluble content is too high during the production of a chloroprene graft copolymer latex, causing reduced wettability when the latex is applied as an adhesive, which may result in reduced adhesive strength. When under the lower limit, the tetrahydrofuran insoluble content does not increase during the production of a chloroprene graft copolymer latex, causing the deteriorated strength of an adhesive layer, which may result in reduced adhesive strength.

A chloroprene polymer latex is producible by radical emulsion homopolymerization of chloroprene (A-1) or by radical emulsion copolymerization of chloroprene (A-1) and a monomer (A-2) that is copolymerizable with the chloroprene (A-1) to give a chloroprene polymer or a chloroprene copolymer (both may be simply referred to collectively as a chloroprene polymer(s); and radical emulsion homopolymerization and radical emulsion copolymerization may be simply referred to collectively as radical emulsion polymerization or emulsion polymerization).

Chloroprene (A-1) is a compound called 2-chloro-1,3-butadiene.

The monomer (A-2) is not particularly limited as long as it is copolymerizable with chloroprene (A-1). Examples thereof are 2,3-dichloro-1,3-butadiene, 1-chloro-1,3-butadiene, butadiene, isoprene, styrene, methacrylic acid, acrylic acid, itaconic acid, 2-methyl-2-pentenoic acid, and 2-butylpropenoic acid. As the monomer (A-2), a monomer may be used alone or a combination of 2 or more monomers may also be used. The copolymerization ratio of the monomer (A-2) is, relative to the total amount of chloroprene (A-1) and the monomer (A-2), preferably 50% by mass or lower, more preferably 40% by mass or lower, and still more preferably 30% by mass or lower.

Radical emulsion polymerization is performed using an emulsifier in an aqueous solvent. Types of emulsifiers are not particularly limited and for example anionic or nonionic emulsifiers are preferred. Since an ethylenic double bond-containing silane coupling agent (B) that is added in a later step has a hydrolyzable alkoxysilane structure, extremely acidic or basic reaction solutions are preferably avoided. Thus, emulsifiers having an emulsifying capability even at a pH near neutral are preferred.

Examples of anionic emulsifiers are an alkali metal salt of a disproportionated rosin acid, dodecylbenzene sulfonates (such as a sodium salt of dodecylbenzenesulfonic acid, and a triethanolamine salt of dodecylbenzenesulfonic acid), diphenyl ether sulfonates (such as a sodium salt of diphenylethersulfonic acid, and an ammonium salt of diphenylethersulfonic acid), naphthalenesulfonates (such as a sodium salt of a β-naphthalenesulfonate formaldehyde condensate), fatty acid alkali metal salts (such as potassium laurate), and polyoxyalkylene alkyl ether sulfonates (such as sodium polyoxyethylene alkyl ether sulfonate).

Examples of nonionic emulsifiers are partially-saponified polyvinyl alcohol, polyoxyethylene nonylphenyl ether, polyoxyethylene octylphenyl ether, and polyoxyethylene lauryl ether.

The above emulsifiers may be used alone or in combination of 2 or more thereof.

For radical emulsion polymerization, an emulsion auxiliary may be used in addition to the above emulsifiers in order to increase emulsion stability. Examples of emulsion auxiliaries include a naphthalene sulfonate formaldehyde condensate.

Polymerization temperature is preferably 10° C. or higher and 50° C. or lower, more preferably 10° C. or higher and 45° C. or lower, and still more preferably 15° C. or higher and 40° C. or lower. At a polymerization temperature within the above range, aggregate formation is suppressed, and a chloroprene graft copolymer latex having sufficiently high adhesive strength is obtained. A polymerization temperature of 10° C. or higher is preferred from the viewpoint of production efficiency since a good polymerization reaction rate is achieved. A polymerization temperature of 50° C. or lower is also preferred from the viewpoint of safety due to suppressed aggregate formation and easy temperature control as well.

For polymerization, a polymerization initiator may be used. Polymerization initiators are not particularly limited and general radical polymerization initiators may be used. Examples of polymerization initiators are organic or inorganic peroxides such as benzoyl peroxide, potassium persulfate, ammonium persulfate, cumene hydroperoxide, and t-butyl hydroperoxide; and azo compounds such as azobisisobutyronitrile. Polymerization initiators may be used alone or in combination of 2 or more thereof.

For polymerization, a promoter may be used in addition to a polymerization initiator. Promoters are not particularly limited and general promoters may be used. Examples of promoters are anthraquinone sulfonate, potassium sulfite, sodium disulfite, sodium sulfite, sodium nitrite, tetraethylenepentamine, and N,N-dimethyl-p-toluidine. Promoters may be used alone or in combination of 2 or more thereof.

For polymerization, a chain transfer agent may be used. A chain transfer agent is mainly used to adjust molecular weight or molecular weight distribution. Usable chain transfer agents are not particularly limited and a xanthogendisulfide or an alkyl mercaptan are preferred. Specific examples of xanthogendisulfides are diisopropylxanthogendisulfide, diethylxanthogendisulfide, dicyclohexylxanthogendisulfide, dilaurylxanthogendisulfide, and dibenzylxanthogendisulfide. Specific examples of alkyl mercaptans are n-dodecylmercaptan, and n-decylmercaptan. Among the above, n-dodecylmercaptan is preferred. The above chain transfer agents may be used alone or in combination of 2 or more thereof.

The conversion of chloroprene (A-1) or the conversion of chloroprene (A-1) and a monomer (A-2) that is copolymerizable with chloroprene in total is preferably 60% or higher and 100% or lower, more preferably 70% or higher and 100% or lower, and still more preferably 75% or higher and 100% or lower. The higher the conversion is, the lower the amount of remaining unreacted components (such as chloroprene) is. As a result, odor emission caused by remaining components is suppressed, and further no removal step is required to remove remaining components after a chloroprene polymerization step, or alternatively if a removal step is performed, a light-load treatment is sufficient. In addition, a risk of sudden heat generation caused by the reaction of the remaining components is also reduced, in the following graft copolymerization step.

In the termination stage of the polymerization, a polymerization terminator may be added at the time when a predetermined conversion is achieved, in order to terminate further polymerization and obtain a chloroprene polymer having a target molecular weight distribution. The types of polymerization terminators are not particularly limited, and specific examples are phenothiazine, para-t-butylcatechol, hydroquinone, hydroquinone monomethyl ether, diethylhydroxylamine, and 4-hydroxy-2,2,6,6-tetramethylpiperidine-1-oxyl free radical. Polymerization terminators may be used alone or in combination of 2 or more thereof.

[2] Ethylenic Double Bond-Containing Silane Coupling Agent (B)

An ethylenic double bond-containing silane coupling agent (B) used in the production method according to the present invention is a silane coupling agent having an ethylenic carbon-carbon double bond in a molecule. Since it has a reactive double bond in a molecule, the ethylenic double bond-containing silane coupling agent (B) is capable of graft copolymerizing to a chloroprene polymer.

Examples of the ethylenic double bond-containing silane coupling agent (B) are vinyl group-containing silane coupling agents (such as vinyltrimethoxysilane, vinyltriethoxysilane, and dimethoxymethylvinylsilane), allyl group-containing silane coupling agents (such as allyltrimethoxysilane, and allyltriethoxysilane), and (meth) acryloyl group-containing silane coupling agents (such as 3-methacryloxypropylmethyldimethoxysilane, 3-methacryloxypropyltrimethoxysilane, 3-methacryloxypropylmethyldiethoxysilane, 3-methacryloxypropyltriethoxysilane, and 3-acryloxypropyltrimethoxysilane). The ethylenic double bond-containing silane coupling agents (B) may be used alone or in combination of 2 or more thereof. Among the above, (meth)acryloyl group-containing silane coupling agent is preferred.

[3] Graft Copolymerization Step

In the production method according to the present invention, the ethylenic double bond-containing silane coupling agent (B) is added to the chloroprene polymer latex to graft copolymerize the ethylenic double bond-containing silane coupling agent (B) to the chloroprene polymer (A) in the chloroprene polymer latex, and thereby a chloroprene graft copolymer latex is produced.

By graft copolymerization, a carbon-carbon double bond contained in the chloroprene polymer (A) is reacted with a carbon-carbon double bond contained in the ethylenic double bond-containing silane coupling agent (B) to effectuate graft copolymerization, forming a chloroprene graft copolymer, resulting in the obtainment of a chloroprene graft copolymer latex in which the particles of the chloroprene graft copolymer are dispersed in water.

The polymerization temperature in the graft copolymerization step is preferably 10° C. or higher and 50° C. or lower, more preferably 20° C. or higher and 45° C. or lower, and still more preferably 25° C. or higher and 40° C. or lower. Since graft copolymerization rapidly proceeds at a polymerization temperature within the above range, a chloroprene graft copolymer latex is efficiently producible. Moreover, the hydrolysis of the ethylenic double bond-containing silane coupling agent (B) before dispersion in a system is suppressed at a polymerization temperature within the above range, which suppresses aggregate formation attributable to the hydrolysis of the ethylenic double bond-containing silane coupling agent (B).

During the graft copolymerization step, the ethylenic double bond-containing silane coupling agent (B) is preferably added in an amount of 0.4 parts by mass or higher and 9.0 parts by mass or lower, more preferably 1.0 parts by mass or higher and 7.0 parts by mass or lower, and still more preferably 2.5 parts by mass or higher and 5.0 parts by mass or lower, relative to 100 parts by mass of the chloroprene polymer (A). When the entire amount of the added ethylenic double bond-containing silane coupling agent (B) is graft copolymerized to the chloroprene polymer (A), a chloroprene graft copolymer, in which 0.4 parts by mass or higher and 9.0 parts by mass or lower of the ethylenic double bond-containing silane coupling agent (B) is graft copolymerized to 100 parts by mass of the chloroprene polymer (A), is obtained. Since the mass of the chloroprene polymer (A) is nearly the same as the mass of solid content contained in the chloroprene polymer latex, the value can be utilized.

When the addition amount of the ethylenic double bond-containing silane coupling agent (B) is within the above range, the cohesive force of the chloroprene polymer (A) is increased by graft copolymerization, thereby increasing the strength of an adhesive layer formed by drying the chloroprene graft copolymer latex. When the addition amount is 0.4 parts by mass or higher relative to 100 parts by mass of the chloroprene polymer, effects produced by the graft copolymerization of the ethylenic double bond-containing silane coupling agent (B) are observed. When the addition amount is 9.0 parts by mass or lower relative to 100 parts by mass of the chloroprene polymer, the stability of emulsion particles increases, suppressing aggregate formation in a reaction solution during the graft copolymerization reaction.

The graft copolymerization may be performed by aqueous radical emulsion polymerization using an emulsifier. The types of emulsifiers are not particularly limited, and anionic or nonionic emulsifiers similar to those used in the chloroprene polymerization may be used. Thus, the obtained chloroprene graft copolymer latexes contain emulsifiers such as anionic or nonionic emulsifiers.

The addition amount of an emulsifier during the graft copolymerization is not particularly limited, and relative to 100 parts by mass of the ethylenic double bond-containing silane coupling agent (B), a range of 0.5 parts by mass or higher and 20.0 parts by mass or lower is preferred, a range of 1.0 parts by mass or higher and 15.0 parts by mass or lower is more preferred, and a range of 2.0 parts by mass or higher and 10.0 parts by mass or lower is still more preferred. When the addition amount of an emulsifier is under the lower limit, emulsification failure or increased viscosity is apt to occur, and problems such as deteriorated controllability of polymerization heat generation, aggregate formation, and poor product appearance often occur. When the addition amount of an emulsifier exceeds the upper limit, the emulsifier is apt to remain, and problems such as deteriorated water resistance, reduced tackiness or adhesive strength, bubble formation during drying of chloroprene graft copolymers, and deteriorated color tones of products often occur.

For the graft copolymerization, a polymerization initiator, a promoter, and a chain transfer agent may be used. Polymerization initiators, promoters, and chain transfer agents are not particularly limited, and initiators, promoters, and chain transfer agents similar to those used in the chloroprene polymerization step may be used.

The conversion of the ethylenic double bond-containing silane coupling agent (B) during the graft copolymerization step is preferably 90% or higher and 100% or lower, more preferably 95% or higher and 100% or lower, and still more preferably 97% or higher and 100% or lower. When the conversion is within the above range, high stickiness and adhesive strength are exerted due to a sufficiently high solid content concentration in the chloroprene graft copolymer latex. In addition, since remaining unreacted components (such as silane coupling agents) are reduced when the conversion is high, no removal step is required to remove remaining components after the chloroprene polymerization step, or alternatively if a removal step is performed, a light-load treatment is sufficient.

With respect to a chloroprene graft copolymer latex to be produced, tetrahydrofuran insoluble content in a chloroprene graft copolymer contained in the latex is preferably 6% by mass or higher and 70% by mass or lower, more preferably 15% by mass or higher and 50% by mass or lower, and still more preferably 17% by mass or higher and 45% by mass or lower, from the viewpoint of maintaining high adhesive strength. Here, tetrahydrofuran insolubles are gelatinous materials of a chloroprene graft copolymer contained in the latex, which are insoluble in tetrahydrofuran and are hard components without stretchability.

When the tetrahydrofuran insoluble content is 70% by mass or lower, an adhesive layer formed by drying a chloroprene graft copolymer latex has excellent rubber properties such as elongation, flexibility, and elasticity. When the tetrahydrofuran insoluble content is 6% by mass or higher, the adhesive layer formed by drying a chloroprene graft copolymer latex has excellent strength.

The tetrahydrofuran insoluble content is controllable by selecting: the types of emulsifiers, chain transfer agents, polymerization initiators, and polymerization terminators used in the graft copolymerization step; the polymerization temperature at which the graft copolymerization is performed; and the conversion of the ethylenic double bond-containing silane coupling agent (B). By the appropriate selection of the above, a tetrahydrofuran insoluble content is controlled to a target numerical value.

During the graft copolymerization, another monomer copolymerizable with the ethylenic double bond-containing silane coupling agent (B) may be added in order to further increase stickiness and adhesive strength of a chloroprene graft copolymer latex to be obtained. When the monomer is added, the addition amount thereof is not particularly limited, and is preferably 0.05 parts by mass or higher and 10.0 parts by mass or lower, more preferably 0.1 parts by mass or higher and 8.0 parts by mass or lower, and still more preferably 0.2 parts by mass or higher and 5.0 parts by mass or lower, relative to 100 parts by mass of the chloroprene polymer (A).

The above monomer is not particularly limited as long as it is copolymerizable with the ethylenic double bond-containing silane coupling agent (B). Examples of the monomers are 1-chloro-1,3-butadiene, 2,3-dichloro-1,3-butadiene, butadiene, isoprene, styrene, acrylonitrile, vinyl acetate, acrylic acid, methacrylic acid, acrylate, and methacrylate. These may be used alone or in combination of 2 or more thereof.

In this case, there is an embodiment, for example, in which the ethylenic double bond-containing silane coupling agent (B) copolymerizes with a monomer copolymerizable with the silane coupling agent (B), and the thus-formed copolymer graft copolymerizes to the chloroprene polymer (A).

In a termination stage of the polymerization, a polymerization terminator may be added at the time when a predetermined conversion is achieved in order to terminate further polymerization and obtain a chloroprene graft copolymer having a target molecular weight distribution. The types of polymerization terminators are not particularly limited and polymerization terminators similar to those used in the chloroprene polymerization step may be used.

The solid content concentration in a chloroprene graft copolymer latex to be produced is preferably 35% by mass or higher and 70% by mass or lower, more preferably 40% by mass or higher and 65% by mass or lower, and still more preferably 45% by mass or higher and 60% by mass or lower. When the solid content concentration is within the above range, reduced time for drying a chloroprene graft copolymer latex and reduced load on a dryer are achievable. In addition, when the solid content concentration is within the above range, keeping the stability of colloids in a chloroprene graft copolymer latex is easier, and aggregate formation is suppressible to a minimum.

[4] Other Steps

In an embodiment of the production method according to the present invention, a step of removing unreacted volatile components may be performed between the chloroprene polymerization step and the graft copolymerization step, or after the graft copolymerization step. In addition, a cooling step, a step of aging during polymerization, or a heating step may be performed before or after, or before and after the chloroprene polymerization step and the graft copolymerization step.

[5] Measurement Method

Solid Content Concentration

For the calculation of the solid content concentration in a chloroprene polymer latex and a chloroprene graft copolymer latex, the chloroprene polymer latex or the chloroprene graft copolymer latex is dried by a heat treatment (at 141° C. for 30 minutes) so as to be solid content alone, and the solid content concentration is calculated from the mass before and after the drying.

Tetrahydrofuran Insoluble Content

With respect to a chloroprene graft copolymer latex, tetrahydrofuran insoluble content may be measured for example as follows. 0.5 g of a chloroprene graft copolymer latex containing water in an amount of 40% by mass or higher and 65% by mass or lower is added dropwise to 100 mL of tetrahydrofuran, the solution is shaken overnight, and is thereafter subjected to separation with a centrifuge to obtain a supernatant dissolved phase. The obtained dissolved phase is heated to 100° C. to evaporate tetrahydrofuran and is dried/solidified for 1 hour to obtain dry solids, and the mass of dry solids as a content dissolved in the dissolved phase is measured. The mass of the dissolved content is subtracted from the mass of a chloroprene graft copolymer contained in the chloroprene graft copolymer latex to calculate a tetrahydrofuran insoluble content.

Here, since the mass of the chloroprene graft copolymer is nearly the same as the mass of solid content in the chloroprene graft copolymer latex, the value may be utilized.

The tetrahydrofuran insoluble content of a chloroprene polymer latex may also be obtained in the same manner as described above.

Conversion

The conversion of chloroprene (A-1) and a monomer (A-2) in total in the chloroprene polymerization step, and the conversion of the ethylenic double bond-containing silane coupling agent (B) in the graft copolymerization step are measured as follows. The solid content concentration in a chloroprene polymer latex or in a chloroprene graft copolymer latex is measured as described above, and the obtained measured value is defined to be S. A solid content concentration (theoretical value) when 100% of a polymerization reaction has proceeded is theoretically calculated and the obtained theoretical value is defined to be $T_{100}$. A solid concentration (theoretical value) when 0% of a polymerization reaction has proceeded is theoretically calculated and the obtained theoretical value is defined to be $T_0$. Then, a conversion (unit: %) is calculated based on the following formula:

Conversion=$(S-T_0)/(T_{100}-T_0) \times 100$

[6] Additives

Stabilizers such as acid acceptors and antioxidants may be added to a chloroprene graft copolymer latex produced by the production method of an embodiment according to the present invention.

When an acid acceptor is added, the addition amount is, relative to 100 parts by mass of a chloroprene graft copolymer, preferably 0.01 parts by mass or higher and 10.0 parts by mass or lower, more preferably 0.1 parts by mass or higher and 8.0 parts by mass or lower, and still more preferably 0.5 parts by mass or higher and 5 parts by mass or lower.

When an antioxidant is added, the addition amount is, relative to 100 parts by mass of a chloroprene graft copolymer, preferably 0.1 parts by mass or higher and 3.0 parts by mass or lower, more preferably 0.5 parts by mass or higher and 2.5 parts by mass or lower, and still more preferably 0.5 parts by mass or higher and 2.0 parts by mass or lower.

By adding a stabilizer in an amount within the above range, the temporal stability of the flexibility of an adhesive layer formed by drying a chloroprene graft copolymer latex is improvable. When the addition amount of an acid acceptor is within the above range, desorbed hydrochloric acid temporally generated from a chloroprene graft copolymer is sufficiently neutralized, thereby suppressing acid-caused deterioration of a latex. In addition, problems such as sedimentation are suppressed due to good colloid stability in a chloroprene graft copolymer latex. When the addition amount of an antioxidant is within the above range, sufficient antioxidant effects are obtained, thereby suppressing latex deterioration.

When a stabilizer is water-insoluble or is a compound destabilizing the colloid state of a chloroprene graft copolymer latex, the stabilizer is made into an aqueous dispersion beforehand, and the dispersion may be added to the chloroprene graft copolymer latex.

The types of acid acceptors are not particularly limited, and examples thereof are zinc oxide, and hydrotalcite (e.g., DHT-4A®, DHT-6 (product names), produced by Kyowa Chemical Industry Co., Ltd). Acid acceptors may be used alone or in combination of 2 or more thereof.

The types of antioxidants are not particularly limited. From the viewpoint of stain resistance, diphenylamine-based antioxidants such as di(4-octylphenyl)amine, p-(p-toluenesulfonylamide)diphenylamine, and 4,4'-bis($\alpha,\alpha$-dimethylbenzyl)diphenylamine are preferred. In addition, from the viewpoint of ozone resistance, N,N'-diphenyl-p-phenylenediamine (DPPD), or N-isopropyl-N'-phenyl-p-phenylenediamine (IPPD) may be used. However, in uses as adhesives in which the discoloration of the protruded portion and hygiene properties of paste glue are regarded as problematic, hindered phenolic antioxidants are preferably used.

In addition to the above stabilizers (i.e., acid acceptors and antioxidants), fillers, tackifiers, pigments, coloring agents, wetting agents, defoaming agents, and thickeners may be optionally added to the chloroprene graft copolymer latex.

With respect to a chloroprene graft copolymer latex produced by the production method of an embodiment according to the present invention, a pH value at a temperature of 23° C. is preferably 5.5 or higher and 13.5 or lower, more preferably 6.0 or higher and 13.5 or lower, and still more preferably 6.5 or higher and 13.0 or lower. The pH value may be adjusted using a base, an acid, or an amino acid. Examples of bases are aqueous solutions of amines such as diethanolamine, and triethanolamine, and of metal hydroxides such as potassium hydroxide, and sodium hydroxide. Examples of acids are inorganic acids such as hydrochloric acid, sulfuric acid, phosphoric acid, and boric acid, and organic acids such as acetic acid and citric acid. Examples of amino acids are glycine and alanine.

[7] Adhesive

An adhesive of an embodiment of the present invention comprises a chloroprene graft copolymer latex produced by the above method. The meaning of the term "adhesives" also includes pressure-sensitive adhesives.

A chloroprene graft copolymer latex may be used alone as it is as an adhesive, and it may contain a tackifier to increase adhesive strength.

The types of tackifiers are not particularly limited and include phenolic resin, terpene resin, rosin derivative resin, and petroleum hydrocarbon. Specific examples are hydrogenated rosin, a pentaerythritol ester of a hydrogenated rosin, polymerized rosin, a rosin modified resin comprising a rosin as a main component, alkyl phenolic resin, rosin-modified phenolic resin, terpene-modified phenolic resin, and natural terpene resin. Tackifiers may be used alone or in combination of 2 or more thereof.

When a tackifier is contained, the content is, relative to 100 parts by mass of solid content in the chloroprene graft copolymer latex, preferably 10 parts by mass or higher and 60 parts by mass or lower, more preferably 20 parts by mass or higher and 55 parts by mass or lower, and still more preferably 25 parts by mass or higher and 50 parts by mass or lower. When the amount of a tackifier is within the above range, tackiness is sufficiently ensured, and adhesive strength is sufficiently increased.

The mixing method of a tackifier is not particularly limited, and is performable for example by adding, to a chloroprene graft copolymer latex, a tackifier in an emulsion form in which the tackifier is emulsified and dispersed.

An adhesive of an embodiment of the present invention may further contain additives such as acid acceptors, antioxidants, fillers, pigments, coloring agents, wetting agents, defoaming agents, and thickeners. Additives similar to those described above may be used.

An adhesive of an embodiment of the present invention exhibits strong adhesive strength by an adhesion method comprising a step of applying the adhesive onto an adherend and bonding the adherend, a step of drying the adhesive, and a step of performing a heat treatment after the drying.

Adherends are not particularly limited, and the adhesives may be used for the adhesion of foams, sheets, films, and glass, and at least one of adherends is preferably glass.

The step of drying the adhesive is preferably performed at a temperature of 10° C. or higher and lower than 50° C.

The heat treatment is preferably performed at a temperature of 50° C. or higher and 100° C. or lower, more preferably 60° C. or higher and 100° C. or lower, and still more preferably 70° C. or higher and 90° C. or lower. By performing the heat treatment at a temperature within the above range, blistering in an insufficiently-dried adhesive layer is suppressible. When glass is used as an adherend, by the above heat treatment, the grafted silane coupling agent interacts with a glass surface, resulting in the obtainment of strong adhesive strength.

When an adhesive of an embodiment of the present invention is used for glass adhesion, a high adhesive strength of 3.0 kN/m or higher, preferably 4.0 kN/m or higher, and more preferably 4.5 kN/m or higher is exhibited. The adhesive strength is measured by a method described in Examples.

EXAMPLES

The present invention is described in further detail based on examples and comparative examples.

Example 1

(1) Preparation of chloroprene polymer latex Into a reactor with an internal volume of 3 L, 970 g of a chloroprene monomer (produced by Showa Denko K.K.), 30 g of methacrylic acid (produced by Tokyo Chemical Industry Co., Ltd.), 41 g of polyvinyl alcohol (product name: PVA-205, produced by Kuraray Co., Ltd.), 6 g of N-lauroyl ethanolamide (product name: Tohol® N-230, produced by TOHO Chemical Industry Co., Ltd.), 1,058 g of pure water, and 4.3 g of n-dodecylmercaptan (chain transfer agent, produced by Tokyo Chemical Industry Co., Ltd.) were fed, and were stirred at a temperature of 40° C. for 15 minutes to give an emulsion.

Sodium sulfite (promoter) was added to the obtained emulsion, potassium persulfate was added as a polymerization initiator, and polymerization was performed in a nitrogen gas atmosphere at a temperature of 45° C. After a conversion of 95% or higher was confirmed, an emulsion of phenothiazine was immediately added to terminate the polymerization, and thereby a chloroprene polymer latex was obtained. The solid content concentration (this was hereinafter regarded as an amount of a chloroprene polymer) was 46.6% and the conversion was 96.6%. The solid content concentration was measured by the method described in the description of embodiments.

(2) Preparation of Chloroprene Graft Copolymer Latex

Into a reactor with an internal volume of 5 L, 1,000 g of the chloroprene polymer latex obtained in the above (1), 2.3 g of 3-methacryloxypropyltrimethoxy silane, 4.7 g of potassium sulfite, 2.6 g of pure water, and 0.25 g of polyvinyl alcohol (product name: PVA-205, produced by Kuraray Co., Ltd.) were fed and were stirred at a temperature of 30° C. for 15 minutes to be emulsified.

To the emulsion, t-butylhydroperoxide was added as a polymerization initiator and aqueous graft copolymerization was performed in a nitrogen atmosphere at a temperature of 30° C. After 5 hours, an aqueous solution of 4-hydroxy-2, 2,6,6-tetramethylpiperidine-1-oxyl free radical was added to terminate the polymerization, and thereby a chloroprene graft copolymer latex was obtained. At that time, the conversion of 3-methacryloxypropyltrimethoxy silane was 100%. The conversion was measured by the method described in the description of embodiments.

With respect to the obtained chloroprene graft copolymer latex, tetrahydrofuran insoluble content (i.e., gel content) in a chloroprene graft copolymer was measured. The results are summarized in Table 1. The measurement method is as described in the description of embodiments.

(3) Preparation of Adhesives

To the obtained chloroprene graft copolymer latex, a terpene phenolic tackifier (TAMANOL® E-100, produced by Arakawa Chemical Industries, Ltd.) and a thickener (SN Thickener 612, produced by San Nopco Limited) were added to produce an adhesive. The terpene phenolic tackifier was added in an amount of 30 parts by mass relative to 100 parts by mass of a chloroprene graft copolymer contained in the chloroprene graft copolymer latex, and an aqueous solution of the thickener with a concentration of 15% by mass was added in an amount of 2 parts by mass relative to 100 parts by mass of the chloroprene graft copolymer.

The adhesive strength of the obtained adhesive was measured, and the results are summarized in Table 1.

The adhesive strength was measured by the following method:

The adhesive in an amount of 200 g/m$^2$ was applied onto a sailcloth (25×150 mm) with a brush and was dried at a temperature of 40° C. for 5 minutes. After left to cool to a temperature of 23° C. for 5 minutes, the adhesive in an amount of 150 g/m$^2$ was applied thereon with a brush. In addition, 200 g/m$^2$ of the adhesive was applied onto a float glass plate (25×150 mm) with a brush. The sailcloth and the float glass plate were each left to stand at room temperature for 10 minutes, and the surfaces on which the adhesive was applied were thereafter laminated in a completely wet state, and were pressure bonded by rolling a hand roller back-and-forth 5 times. Subsequently, the pressure-bonded material was dried and aged at a temperature of 23° C. and a relative humidity (RH) of 60% for 3 days to obtain a test sample for a room temperature adhesive strength test. In addition, the test sample was heat treated at a temperature of 70° C. for 1 hour and was thereafter left to cool to 23° C. to obtain a test sample for a 70° C. adhesive strength test.

With respect to the measurement of adhesive strength (peel strength), a peel strength to a glass plate at 180° was measured in accordance with JIS-Z0237:2009, with a tensile strength tester at a tensile speed of 200 mm/minute.

In addition, whether the peeled portion causes interface failure or cohesion failure was observed. In the present example, interface failure means a state in which peeling occurs in the interface between the glass plate and the adhesive layer, which occurs when adhesive strength is lower than the strength of the adhesive layer. Cohesion failure means a state in which the adhesive layer breaks and peeling occurs, which occurs when adhesive strength to an adherend exceeds the strength of the adhesive layer. The cohesion failure is an ideal peeling state for the adhesion of adherends having high strength.

Examples 2 to 7

During the preparation of a chloroprene graft copolymer latex, the same operation as that described in Example 1 was performed, except for changing the type and amount of the silane coupling agent and the amount of polyvinyl alcohol to those described in Table 1, and the gel content and adhesive strength were evaluated. The results are also summarized in Table 1.

Comparative Example 1

During the preparation of a chloroprene graft copolymer latex, the same operation as that described in Example 1 was performed, except for changing the amounts of the silane coupling agent and polyvinyl alcohol to those described in Table 2. However, no chloroprene graft copolymer latex was obtained due to particle aggregation during graft copolymerization.

Comparative Example 2

The chloroprene polymer latex prepared in Example 1 was not graft copolymerized, and the gel content and adhesive strength of the chloroprene polymer latex were evaluated as-is. The results are also summarized in Table 2.

Comparative Example 3

Into a reactor with an internal volume of 3 L, 965 g of chloroprene, 30 g of methacrylic acid, 5 g of 3-methacryloxypropyltrimethoxy silane, 41 g of polyvinyl alcohol (product name: PVA-205, produced by Kuraray Co., Ltd.), 6 g of N-lauroyl ethanolamide (product name: Tohol® N-230, produced by TOHO Chemical Industry Co., Ltd.), 1,058 g of pure water, and 4.3 g of n-dodecylmercaptan (chain transfer agent) were fed, and were stirred at a temperature of 30° C. for 15 minutes to give an emulsion.

Sodium sulfite was added to the obtained emulsion, subsequently potassium persulfate was added as a polymerization initiator, and polymerization was performed in a nitrogen gas atmosphere at a temperature of 45° C. After a conversion of 95% or higher was confirmed, an emulsion of phenothiazine was immediately added to terminate the polymerization to give a chloroprene copolymer latex. The solid content was 46.5% and the monomer conversion was 96.4%.

The gel content and adhesive strength of the obtained chloroprene copolymer latex were evaluated in the same manner as described in Example 1. The results are also summarized in Table 2.

Comparative Example 4

The adhesive strength of an organic solvent-based adhesive (product name: 1521B produced by ThreeBond Fine Chemical Co., Ltd.) containing a chloroprene polymer was evaluated in the same manner as described in Example 1, and the results are summarized in Table 2.

Comparative Example 5

During the preparation of a chloroprene graft copolymer latex, the same operation as that described in Example 1 was performed, except for changing the type and amount of the silane coupling agent and the amount of polyvinyl alcohol to those described in Table 2 and adopting a polymerization temperature of 80° C., and the gel content and adhesive strength were evaluated. Due to a large amount of aggregates formed immediately after the polymerization initiation, a reaction conversion could not be calculated accurately. The results are summarized in Table 2.

TABLE 1

| | | | Example 1 | Example 2 | Example 3 | Example 4 | Example 5 | Example 6 | Example 7 |
|---|---|---|---|---|---|---|---|---|---|
| Conditions for graft copolymerization step | Chloroprene polymer (parts by mass) | Chloroprene polymer | 100 | 100 | 100 | 100 | 100 | 100 | 100 |
| | Silane coupling agent (parts by mass) | 3-methacryloxypropyltrimethoxy silane | 0.5 | 1 | 3 | 5 | 7.5 | — | — |
| | | Dimethoxymethylvinyl silane | — | — | — | — | — | 3 | — |
| | | Allytrimethoxy silane | — | — | — | — | — | — | 3 |
| | Emulsifier (parts by mass) | Polyvinyl alcohol | 0.05 | 0.1 | 0.2 | 0.4 | 0.5 | 0.2 | 0.2 |
| | Promoter (parts by mass) | Potassium sulfite | 1 | 1 | 1 | 1 | 1 | 1 | 1 |
| Evaluation | | Conversion (%) | 100 | 100 | 100 | 100 | 100 | 100 | 100 |
| | | Gel content (%) | 29% | 36% | 42% | 49% | 68% | 32% | 37% |
| | Adhesive strength | Room temperature Peeling strength (kN/m) | 0.1 | 0.1 | 0.2 | 0.2 | 0.2 | 0.1 | 0.1 |
| | | Broken portion | Interface failure | Interface failure | Interface failure | Interface failure | Interface failure | Interface failure | Interface failure |
| | | 70° C. Peeling strength (kN/m) | 4.2 | 4.7 | 5.4 | 5.2 | 4.1 | 4.1 | 4.5 |
| | | Broken portion | Cohesion failure | Cohesion failure | Cohesion failure | Cohesion failure | Cohesion failure | Cohesion failure | Cohesion failure |

TABLE 2

| | | | Comparative Example 1 | Comparative Example 2 | Comparative Example 3 | Comparative Example 4 | Comparative Example 5 |
|---|---|---|---|---|---|---|---|
| Conditions for graft copolymerization step | Chloroprene polymer (parts by mass) | Chloroprene polymer | 100 | 100 | — | — | 100 |
| | | Chloroprene copolymer | — | — | 100 | — | — |
| | Silane coupling agent (parts by mass) | 3-methacryloxypropyltrimethoxy silane | 10 | — | — | — | 5 |
| | Emulsifier (parts by mass) | Polyvinyl alcohol | 0.5 | — | — | — | 0.2 |
| | Promoter (parts by mass) | Potassium sulfite | 1 | — | — | — | 1 |
| | | Conversion (%) | Unmeasurable | — | — | — | Unmeasurable |
| Evaluation | | Gel content (%) | | 27% | 71% | — | 79% |
| | Adhesive strength | Room temperature Peeling strength (kN/m) | 0.2 | 0.1 | 1.0 | 0.2 | |
| | | Broken portion | Interface failure | Interface failure | Interface failure | Interface failure | |
| | | 70° C. Peeling strength (kN/m) | 2.8 | 1.3 | 0.8 | 2.9 | |

TABLE 2-continued

|  | Comparative Example 1 | Comparative Example 2 | Comparative Example 3 | Comparative Example 4 | Comparative Example 5 |
|---|---|---|---|---|---|
| Broken portion |  | Interface failure | Interface failure | Interface failure | Interface failure |

As is obvious from Tables 1 and 2, the adhesives obtained in Examples 1 to 7 had high adhesiveness strength compared with those obtained in Comparative Examples 1 to 5. The high adhesive strength was achieved regardless of the type of the silane coupling agent used.

In contrast, Comparative Example 1, which contains 3-methacryloxypropyltrimethoxy silane in a ratio being increased to 10 parts by mass relative to the amount of the chloroprene polymer, exhibited poor particle stability during the polymerization, causing aggregate formation during the polymerization. It is supposed that the hydrolyzing silane coupling agents were bonded during the polymerization due to the increased ratio of the silane coupling agent, resulting in instability of a chloroprene graft copolymer latex, causing aggregation during the polymerization.

Comparative Example 2, which was an adhesive prepared by using a chloroprene polymer latex obtained in the chloroprene polymerization step, exhibited low adhesive strength since graft copolymerization was not performed.

Comparative Example 3 was obtained by copolymerizing a silane coupling agent in the chloroprene polymerization step. It is supposed that the adhesive strength deteriorated since the ratio of the silane coupling agent being present on particle surfaces was reduced due to many monomers other than the silane coupling agent during the polymerization.

Comparative Example 4, using an organic solvent-based adhesive, not an aqueous adhesive, exhibited low adhesive strength to glass, compared with the chloroprene graft copolymer latexes of Examples 1 to 7.

Comparative Example 5 adopted a polymerization temperature of 80° C. As a result, graft copolymerization did not proceed normally due to a great amount of aggregates formed immediately after the polymerization initiation. For this reason, it is supposed that effects of the graft copolymerization of the silane coupling agent were not exhibited, thereby causing low adhesive strength.

The invention claimed is:

1. A method for producing a chloroprene graft copolymer latex, comprising a step for adding an ethylenic double bond-containing silane coupling agent (B) to a chloroprene polymer latex and graft-copolymerizing the ethylenic double bond-containing silane coupling agent (B) to a chloroprene polymer (A) in the chloroprene polymer latex at a temperature of 10° C. or higher and 50° C. or lower, wherein the addition amount of the ethylenic double bond-containing silane coupling agent (B) is 0.4 parts by mass or higher and 9.0 parts by mass or lower relative to 100 parts by mass of the chloroprene polymer (A).

2. The method for producing a chloroprene graft copolymer latex according to claim 1, wherein the ethylenic double bond-containing silane coupling agent (B) is a (meth)acryloyl group-containing silane coupling agent.

3. The method for producing a chloroprene graft copolymer latex according to claim 1, wherein the tetrahydrofuran insoluble content in a chloroprene graft copolymer being present in the chloroprene graft copolymer latex is 6% by mass or higher and 70% by mass or lower of the amount of the chloroprene graft copolymer.

4. The method for producing a chloroprene graft copolymer latex according to claim 1, wherein the chloroprene polymer latex is obtained by radical emulsion homopolymerization of chloroprene (A-1) or by radical emulsion copolymerization of chloroprene (A-1) and a monomer (A-2) being copolymerizable with the chloroprene (A-1).

5. The method for producing a chloroprene graft copolymer latex according to claim 4, wherein an emulsifier used in the radical emulsion homopolymerization or in the radical emulsion copolymerization is at least one emulsifier selected from anionic emulsifiers and nonionic emulsifiers.

6. An adhesive comprising a chloroprene graft copolymer latex obtained by the method according to claim 1.

7. The adhesive according to claim 6, comprising at least one additive selected from tackifiers, acid acceptors, and antioxidants.

8. The adhesive according to claim 6 that is used for glass adhesion.

9. An adhesion method comprising a step of applying the adhesive according to claim 6 onto an adherend and bonding the adherend, a step of drying the adhesive, and a step of performing a heat treatment at a temperature of 50° C. or higher and 100° C. or lower after the drying.

10. The adhesion method according to claim 9, wherein at least one of the adherends is glass.

11. The method for producing a chloroprene graft copolymer latex according to claim 2, wherein the tetrahydrofuran insoluble content in a chloroprene graft copolymer being present in the chloroprene graft copolymer latex is 6% by mass or higher and 70% by mass or lower of the amount of the chloroprene graft copolymer.

12. The method for producing a chloroprene graft copolymer latex according to claim 2, wherein the chloroprene polymer latex is obtained by radical emulsion homopolymerization of chloroprene (A-1) or by radical emulsion copolymerization of chloroprene (A-1) and a monomer (A-2) being copolymerizable with the chloroprene (A-1).

13. The method for producing a chloroprene graft copolymer latex according to claim 12, wherein an emulsifier used in the radical emulsion homopolymerization or in the radical emulsion copolymerization is at least one emulsifier selected from anionic emulsifiers and nonionic emulsifiers.

14. An adhesive comprising a chloroprene graft copolymer latex obtained by the method according to 2.

15. The adhesive according to claim 14, comprising at least one additive selected from tackifiers, acid acceptors, and antioxidants.

16. The adhesive according to claim 14 that is used for glass adhesion.

17. An adhesion method comprising a step of applying the adhesive according to claim 14 onto an adherend and bonding the adherend, a step of drying the adhesive, and a step of performing a heat treatment at a temperature of 50° C. or higher and 100° C. or lower after the drying.

18. The adhesion method according to claim 17, wherein at least one of the adherends is glass.

* * * * *